United States Patent
Bozionek et al.

(10) Patent No.: US 8,619,117 B2
(45) Date of Patent: Dec. 31, 2013

(54) METHOD FOR TRANSMITTING MULTIMEDIA TICKER INFORMATION

(75) Inventors: Bruno Bozionek, Borchen (DE); Karl Klaghofer, München (DE); Holger Prange, München (DE); Michael Tietsch, Kaufering (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 335 days.

(21) Appl. No.: 13/119,442

(22) PCT Filed: Sep. 25, 2008

(86) PCT No.: PCT/EP2008/008141
§ 371 (c)(1),
(2), (4) Date: Mar. 31, 2011

(87) PCT Pub. No.: WO2010/034328
PCT Pub. Date: Apr. 1, 2010

(65) Prior Publication Data
US 2011/0169907 A1 Jul. 14, 2011

(51) Int. Cl.
*H04N 7/14* (2006.01)

(52) U.S. Cl.
USPC .................... 348/14.07; 348/14.01

(58) Field of Classification Search
USPC .......... 348/14.01, 14.02, 14.03, 14.04, 14.05, 348/14.06, 14, 7, 14.08, 14.09, 14.1, 14.11, 348/14.12, 14.13, 14.14, 15.15, 14.16; 715/764, 774
See application file for complete search history.

(56) References Cited

U.S. PATENT DOCUMENTS

| | | | |
|---|---|---|---|
| 8,060,407 B1* | 11/2011 | Delker et al. | 705/14.68 |
| 2006/0098624 A1* | 5/2006 | Morgan et al. | 370/352 |
| 2006/0230154 A1 | 10/2006 | Nguyenphu et al. | |
| 2007/0086728 A1* | 4/2007 | Dolph | 386/95 |
| 2007/0198739 A1* | 8/2007 | Jennings et al. | 709/231 |
| 2008/0155453 A1* | 6/2008 | Othmer | 715/774 |
| 2009/0210899 A1* | 8/2009 | Lawrence-Apfelbaum et al. | 725/34 |

FOREIGN PATENT DOCUMENTS

| | | |
|---|---|---|
| WO | 2005/041521 A1 | 5/2005 |
| WO | 2006/117644 A1 | 11/2006 |
| WO | 2006/124790 A2 | 11/2006 |

OTHER PUBLICATIONS

IETF—Networking Group—Request for Comments (RFC) 4566—SDP: Session Description Protocol, Handley et al., Jul. 2006.*

(Continued)

*Primary Examiner* — Khai N Nguyen
(74) *Attorney, Agent, or Firm* — Buchanan Ingersoll & Rooney PC

(57) ABSTRACT

Transmission parameters for the transmission of at least one ticker information (ti) are transmitted during signaling of the transmission parameters for at least one multimedia data stream (mmd) for a session (S), the parameters establishing an additional logical transmission channel for the transmission of ticker information (ti), specifying the transmission protocol (RTP) and the payload type (555,666, 777,888) and inserting a source information which shows the source of the ticker information (ti). A session description protocol (SDP) embedded in a session initiation protocol (SIP) is used to describe and administer the transmission parameters. The invention allows the signaling for the additional information or ticker information (ti) to be implemented into existing network protocols for packet-oriented networks with only minor additional signaling and transmission operations.

20 Claims, 2 Drawing Sheets

(56) References Cited

OTHER PUBLICATIONS

Written Opinion of the International Searching Authority dated Jul. 10, 2009 (Form PCT/ISA/237) (English Translation).
International Preliminary Report on Patentability dated Mar. 29, 2011 (Form PCT/IB/373, PCT/ISA/237) (German Translation).
International Preliminary Report on Patentability dated Mar. 29, 2011 (Form PCT/IB/373, PCT/ISA/237) (English Translation).
International Search Report for PCT/EP2008/008141 dated Jul. 10, 2009 (Form PCT/ISA/210) (German Translation).
International Search Report for PCT/EP2008/008141 dated Jul. 10, 2009 (Form PCT/ISA/210) (English Translation).
Written Opinion of the International Searching Authority dated Jul. 10, 2009 (Form PCT/ISA/237) (German Translation).

* cited by examiner

METHOD FOR TRANSMITTING MULTIMEDIA TICKER INFORMATION

CROSS-REFERENCE TO RELATED APPLICATIONS

This application is the United States national phase under 35 U.S.C. §371 of PCT International Patent Application No. PCT/EP2008/008141, filed on Sep. 25, 2008.

BACKGROUND OF THE INVENTION

1. Field of the Invention

Embodiments of the invention relate to the field of providing ticker information in video-telephony systems.

2. Background of the Related Art

Ticker information is sometimes inserted into television programs—especially news programs. By using ticker information, additional information is displayed to a viewer of a currently running television program. Ticker information can be information such as a current event, stock market prices, subtitles for television programs or translations. The ticker information is most often inserted as a linear ticker in the current television picture.

In video telephony systems, video conference systems for example, a multimedia data stream communication link is transmitted between terminals or between video conference devices over a packet-oriented network, in which preferably a network protocol is used that is suitable for setup of a communication link or session with a multimedia data stream. Network protocols for packet-oriented networks are predominantly based on IP protocol.

BRIEF SUMMARY OF THE INVENTION

An important aspect of the method according to the invention is that the transmission parameters for the transmission of a piece of ticker information are transferred together with the signaling of the transmission parameters for the multimedia data stream for a session; in this way another logical transmission channel for the transfer of ticker information is established through the parameters, the transmission protocol and the payload type are specified as well as a source of information is inserted that displays the source of the ticker information. A standardized SIP protocol is preferably provided for the initialization of a session, in which a standardized session description protocol is inserted for the description and administration of the transmission parameters that are negotiated by a SIP protocol, both for the multimedia data streams and for the ticker information. Ticker information is typically inserted as a text crawl or multimedia information also in a display device such as a monitor screen. Ticker information, in terms of the invention, however, includes all possible types of text notation on video images. For example, text or multimedia information can also be presented from bottom to top or as an "overlay" over a displayed picture.

An important advantage of the invention is that additional information, the ticker information, can be transmitted to the multimedia data streams of a telephony system, where the additional information can be provided from different sources such as from the terminals involved in a communication link such as conferencing devices or from any information source on a network, such as the Internet for example. Another advantage is found in the fact that signaling for additional information can be implemented with minimum signaling and transmission effort in available network protocols for packet-oriented networks.

According to a further embodiment of the invention, the source information or the information source is provided by a Uniform Resource Identifier (URI), which specifies the domain from which the ticker information is delivered. As a result, very extensive information sources can be specified that can provide or deliver additional information, especially ticker information.

According to an advantageous transmission protocol, additionally the port over which the ticker information is transmitted is specified and an xml, html, text or video payload type is provided as the payload type for the ticker information. In addition, formatting information and/or display information which adjusts the ticker information to the display device can be advantageously included for playback of the ticker information on the display devices assigned to the network terminals. As a result, adjustment to different display devices such as monitor screens or LCD displays is possible.

Further advantageous embodiments of the invention as well as an advantageous communication arrangement for carrying out the method according to the invention are found in further claims.

DETAILED DESCRIPTION OF THE INVENTION

Figure 1:
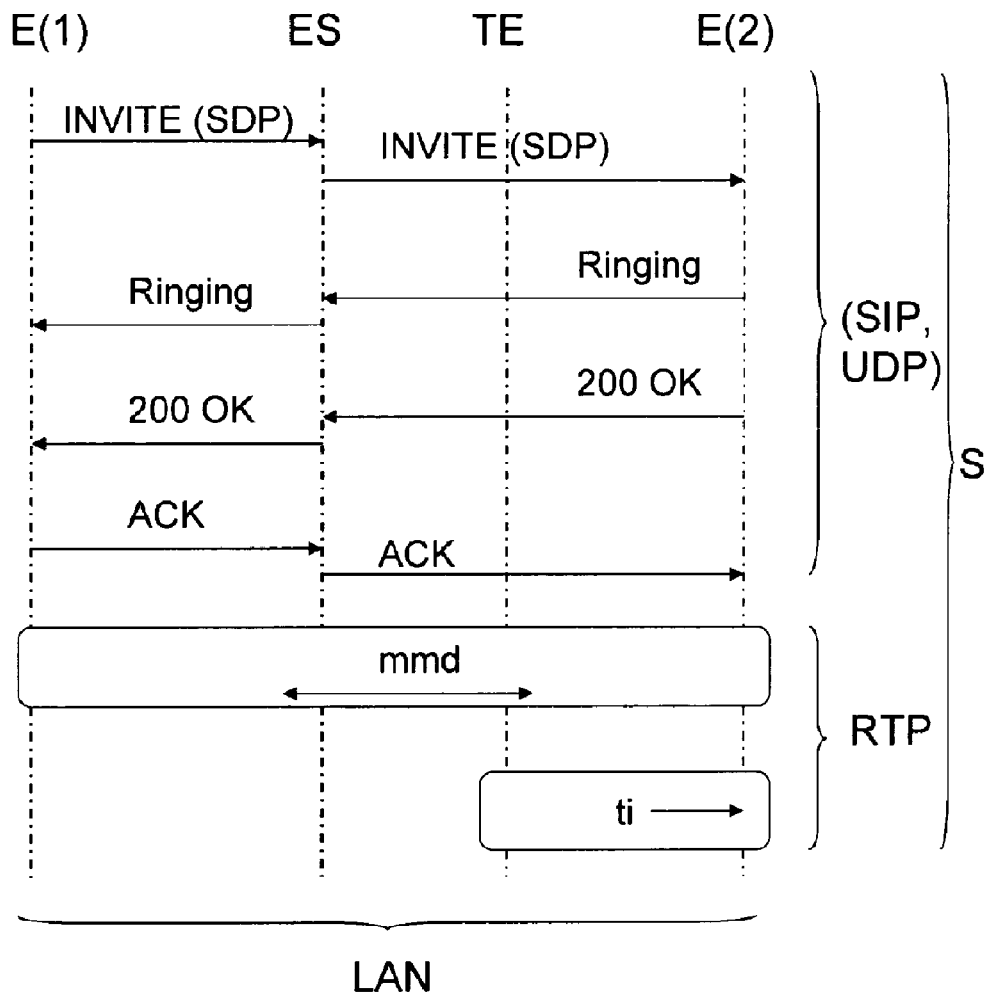
FIG. 1 shows a flow chart representing an embodiment of the invention.

For the exemplary embodiment, it is assumed that in a network LAN two terminal devices E(1), E(2) establish a session S for a video-telephone communication link in order to bidirectionally transmit respectively at least one multimedia data stream mmd after the establishment of session S—alternatively a session for a unidirectional transmission can also be established. For example, such a communication link can be a video conference between two parties or their terminals E(1),E(2) or conferencing devices. For example, a standardized SIP protocol SIP (Session Initiation Protocol), currently according to the RFC standard 3261, is provided as the network protocol for establishment of a session for a video-telephony session identified as session S in the following. Other network protocols for the transmission of multimedia data mmd are possible as alternatives.

For example, a standardized session description protocol SDP, currently according to RFC standard 4566, is provided for the description or administration of properties and transmission parameters of the multimedia data streams mmd of a session S. The transmission parameters of the multimedia data streams mmd negotiated using the SIP protocol SIP are described and administered for the duration of a session S using the session description protocol SDP.

Below, an example of a protocol excerpt from a session description protocol SDP is shown, in which the transmission parameters according to the invention are inserted for ticker information ti to be transmitted:

V=0
1)
O=alice 2890844526 2890844526 IN IP4 alice.enterprise.com
2)
s=-
3)
c=IN IP4 192.0.2.1.101
4)
m=audio 49172 RTP/AVP 0
5)
a=rtpmap:0 PMCU/8000
6)
m=video 4200 RTP/AVP 111 112 34
7)
a=rtpmap:111 H264/90000
8)
a=rtpmap:112 H264/90000
9)
a=fmtp 111 profile-level-id=428010;packetization-mode=0
10)
a=fmtp 112 profile-level-id=428010;packetization-mode=1
11)
Extension according to the invention:
m=ticker 4299 udp 555 666 777 888
12)
a=rtpmap: 555 ticker_xml
13)
a=rtpmap: 666 ticker html
14)
a=rtpmap: 777 ticker_plaintext
15)
a=rtpmap: 888 ticker_video
16)
a=fmtp 666 URL=news.enterprise.com/ticker
17)
Explanations for protocol excerpt SDP:
1) Specifies the protocol version
2) Describes the origin of a session and defines the session; 2890844526=session number;
3) s=name of session, no name in exemplary embodiment
4) c=connection data: IN indicates Internet network type, IP4=Internet protocol type 4, 192.0.2.1.101=IP address;
5) m=type of audio data stream;
49172=port number;
RTP/AVP=real-time protocol is transport protocol for audio and
video conferences, 0=payload type 0;
6) a=attribute for audio data stream;
rtpmap:0 PCMU/8000 is payload type 0 as well as coding parameters
for audio data stream;
7) m=two video type data streams with payload type 111 and 112;
4200 is port number;
RTP/AVP=real-time protocol is transport protocol for audio and video conferences, 111, 113=payload type 111,113;
8) rtpmap:111 is payload type 111;
H264/90000 is the first video data stream in standardized form H.264;
9) rtpmap:112 is payload type 112;
H264/90000 is the second video data stream in standardized form H.264;
10) fmtp: 111 format-specific parameter for payload type 111
Profile level id=428010 indicates the profile that supports the codec for decoding the compressed video data stream and indicates the highest level of the signaled profile;
packetization mode 1 indicates the packet assembly mode for the video data stream formatted according to H.264;
11) like 10) however for payload type 112;
12) m=ticker 4299 udp 555 666 777 888,
m=ticker data stream (indicates that the following attributes relate to a ticker type of data stream, the ticker type data stream is an additional type of data stream to the previously specified audio type and video type data streams);
4299 is port number;
udp 555 666 777 888=standardized transmission protocol is the user data protocol UDP with the different payload types 555 666 777 888,
13) a=rtpmap: 555 ticker_xml is a dynamic payload type 555 that is an XML-formatted ticker data stream;
14) a=rtpmap: 666 ticker_xml is a dynamic payload type 666 that is an HTML-formatted ticker data stream;
15) a=rtpmap: 777 ticker_plain text is a dynamic
Payload type 777 that is an ASCII code-formatted ticker data stream; (additional ticker data stream formats are possible as well (not shown in embodiment));
16) a=rtpmap: 888 ticker_video is a dynamic payload type 88 that is a ticker data stream provided in video format.
17) fmtp 666 URL=news.enterprise.com/ticker
The following payload-specific parameters are specified for payload type 666: Universal Resource Locator URL indicates the source or information source of the ticker data stream or ticker information ti from which the ticker information ti is delivered or provided in HTML format. The URL constitutes an address or identifier in a network with IP protocol in particular. The ticker information ti can be also retrieved by a terminal device E at this URL and for example correspondingly included or inserted in a video image on a display unit in the area of the terminal or in the terminal-for example a monitor screen of a conferencing unit.

The payload types 555, 666, 777, 888 are specified in the example, that is, in the specific case only one of the payload types in the session description protocol SDP is displayed together with one of the sources of the ticker information ti source information.

For the embodiment example, it is assumed that the ticker information ti or the ticker data stream is provided by a ticker device TE on the Internet and is transmitted as a ticker data stream to the terminal device E of the network LAN or to a conferencing device. In addition, for the embodiment it is assumed that a session S is initiated from the first terminal device E(1) through an enterprise system ES (not shown), for example, a server structure in the local network LAN.

Moreover, an INVITE message INVITE is generated in the first terminal E(1) according to the SIP protocol SIP and transmitted to the enterprise system ES. In a SIP message INVITE generated according to the RFC standard 3261, primarily information about the message type, target address, SIP version, SIP address, port number and the transport protocol for the responses to the message is specified.

In the session description protocol SDP embedded in the SIP protocol SIP, the transmission parameters, in accordance with the preceding explanations, are described for the multimedia data streams mmd—video and audio data streams— for the session S with video-audio data transmission—shown in the FIGURE by the label INVITE (SDP). According to the invention, in addition the transmission parameters for the transmission of ticker information ti are inserted in the session description protocol SDP, where a ticker device TE on the Internet is addressed by the universal resource identifier URI.

The enterprise system ES transmits the INVITE message INVITE including the embedded session description protocol SDP through the local network LAN to the second terminal device E(2)—shown in the FIGURE by an arrow designated INVITE (SDP). In the second terminal E(2) a 180 ringing message 180 Ringing is generated according to the SIP protocol SIP and transmitted via the enterprise system ES to first terminal E(1)—shown in the FIGURE by an arrow designated 180 Ringing. Through this 180 ringing message 180 Ringing, it is indicated to the enterprise system ES or the first terminal E(1) that the second terminal E(2) or a conferencing device on the second terminal E(2) (not shown) could be detected in the local network LAN.

Subsequently, a 200 OK message 200 OK is generated in the second terminal E(2) according to the SIP protocol SIP and transmitted via the enterprise system ES to first terminal E(1)—shown in the FIGURE by an arrow designated OK 200. Through these 200 OK messages 200 OK, it is indicated to the enterprise system ES and the first terminal E(1) that the second terminal E(2) has accepted an initialization of the signaled session S. As a result, an ACK message is generated in the first terminal E(1) according to the SIP protocol SIP and transmitted via the enterprise system ES and the local network LAN to the second terminal E(2). As a result, the transmission of the 200 OK message OK 200 is confirmed by the second terminal E(2).

Using the now negotiated addresses and the transmission protocols as well as transmission parameters, session S is established and the bidirectional transmission of the multimedia data streams mmd can begin.

According to the example, the ticker information ti is provided from a ticker device TE and is transmitted to the second terminal E(2) via the local network LAN, according to the transmission protocol specified in the SDP protocol SDP and the negotiated transmission parameters. Due to the fact that the ticker device TE is located on the Internet in the example, it is assumed in the embodiment that the Internet can be accessed by the local network LAN (not shown). Alternatively, the ticker device TE can also be located on the local network LAN.

The ticker information ti advantageously establishes a logical connection to the ticker device TE on the Internet using the universal resource locator URL available on a second terminal E(2) and retrieves the provided ticker information ti from there.

Alternatively, the ticker information ti also can be provided by one of the two terminals E(1),E(2) and distributed to or retrieved by one of these terminals E involved in the communication link, wherein the terminal E that is providing the ticker information ti is described as the source in the session description protocol SDP.

Figure 2:
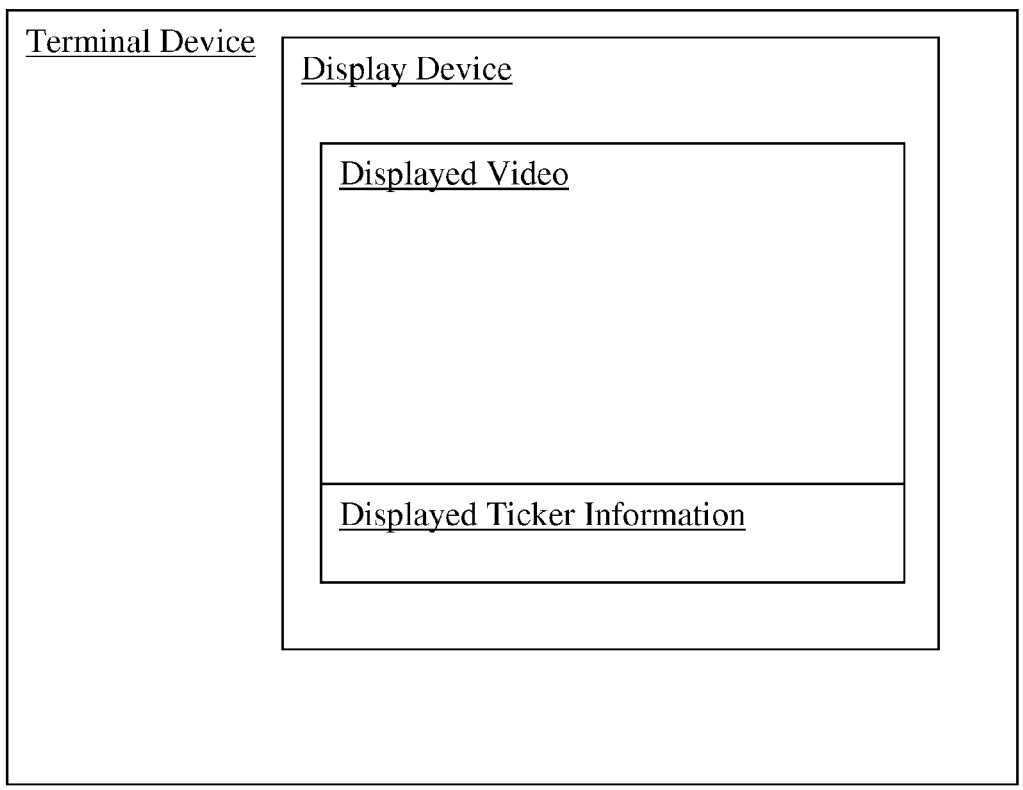
FIG. 2 illustrates a block diagram of an exemplary display of a terminal device displaying ticker information.

In the second terminal E(2), for example a conferencing device, the multimedia data streams mmd are reconstructed as a video image on a display device or a monitor screen. The ticker information ti is usually inserted as a linear ticker crawl on the running video image of the display device or monitor screen, as may be seen from FIG. 2. An insertion method can be provided that is already used for the insertion of ticker information ti on television screens. Alternatively, any configuration of insertion of ticker information is possible, for example, non-linear, a specified area of the screen or on the entire screen.

The invented method is not limited to the example, but also can be used for the retransfer of additional information in terms of ticker information—for example televoting in video conferences—from one terminal to the terminals involved in the communication link. Also, the ticker information can be sent to other IP addresses or terminals and devices such as telephones or personal computers, where the other devices perform like a ticker device. Additionally, display information may be inserted as transmission parameters in the session description protocol that cause an adjustment of the display devices upon playback of the ticker information, e.g. formatting information, rendering information, filter information and speed adaptation information.

The invention claimed is:

1. A method for transmission of ticker information comprising:
    a first terminal generating a first message for signaling to a second terminal for an attempt to establish a multimedia data connection in which at least one of audio data and video data is to be transmitted from the first terminal to the second terminal, the first message generated in accordance with Session Initiation Protocol (SIP), the first message having data in accordance with Session Description Protocol (SDP) embedded therein that identifies transmission parameters for the multimedia data connection and also includes parameters for transmission of ticker information to the second terminal, the parameters for transmission of the ticker information comprising an address at which ticker information from a ticker device is receivable;
    the second terminal receiving the first message;
    in response to receiving the first message, the second terminal sending a second message to the first terminal that accepts establishment of the multimedia data connection;
    in response to receiving the second message, the first terminal sending a third message to the second terminal to acknowledge receipt of the second message;
    establishing the multimedia data connection between the first and second terminals such that ticker information from the ticker device is also sent to the second terminal when the multimedia data connection between the first and second terminals is formed such that the second terminal receives audio data and video data from the first terminal and also receives ticker information from the ticker device for displaying ticker information along with displaying video during the established multimedia data connection, the video displayed by the second terminal being based on the video data received from the first terminal; and
    the second terminal displaying ticker information along with the displayed video based on the video data received from the first terminal such that the displayed ticker information displayed by the second terminal is inserted within the video displayed by the second terminal, the displayed ticker information displayed by the second terminal being based on the ticker information the second terminal received from the ticker device via the address identified in the first message.

2. The method of claim 1, wherein the address at which ticker information from the ticker device is receivable is a uniform resource identifier that identifies a source of the ticker information.

3. The method of claim 1 comprising specifying a transmission protocol with a respective port through which the ticker information is transmitted in the parameters for transmission of ticker information included within the first message.

4. The method of claim 1 comprising specifying a payload type within the transmission parameters of the first message.

5. The method of claim 4, comprising providing a standardized session description protocol for description and administration of the ticker information and at least one member of the group consisting of a standardized user data protocol, a transmission control protocol, a transport layer security protocol, a datagram transport layer security protocol, and a standardized real-time protocol for establishment of the multimedia data connection.

6. The method of claim 1, comprising inserting at least one of formatting information and display information within the first message to define how to adjust the ticker information for displaying the ticker information for playback of the ticker information.

7. The method of claim 1, comprising reconstructing the ticker information displayed by the second terminal for playing back the displayed ticker information.

8. The method of claim 1 wherein the ticker information that is displayed by the second terminal is inserted linearly as crawling information or in a specified area in one playback screen of the second terminal.

9. The method of claim 1, wherein the establishing of the multimedia data connection between the first and second terminals such that ticker information from the ticker device is also sent to the second terminal when the multimedia data connection between the first and second terminals is formed occurs such that there is a first connection between the second terminal and the first terminal that is formed based on the transmission parameters for the multimedia data connection and a second connection between the second terminal and the ticker device that is formed based on the parameters for transmission of ticker information, the video data received by the second terminal from the first terminal being received via the first connection, the ticker information transmitted from the ticker device received by the second terminal being transmitted to the second terminal via the second connection.

10. The method of claim 1 wherein the multimedia data connection is a video-telephone communication connection.

11. A system for transmission and display of ticker information comprising:
a plurality of terminal devices connected to an enterprise system through a packet-oriented network, the terminal devices comprising a first terminal and a second terminal;
a ticker device connectable to the second terminal;
the first terminal generating a first message for signaling to the second terminal for an attempt to establish a multimedia data connection in which at least one of audio data and video data is to be transmitted from the first terminal to the second terminal, the first message generated in accordance with Session Initiation Protocol (SIP), the first message having data in accordance with Session Description Protocol (SDP) embedded therein that identifies transmission parameters for the multimedia data connection and also includes parameters for transmission of ticker information to the second terminal, the parameters for transmission of the ticker information comprising an address at which ticker information from the ticker device is receivable;
the second terminal receiving the first message;
in response to receiving the first message, the second terminal sends a second message to the first terminal that accepts establishment of the multimedia data connection;
in response to receiving the second message, the first terminal sending a third message to the second terminal to acknowledge receipt of the second message;
after sending of the third message, the first and second terminals establishing the multimedia data connection between the first and second terminals such that ticker information from the ticker device is also sent to the second terminal when the multimedia data connection between the first and second terminals is formed such that the second terminal receives audio data and video data from the first terminal and also receives ticker information from the ticker device for displaying ticker information along with displaying video during the established multimedia data connection, the video displayed by the second terminal being based on the video data received from the first terminal; and
the second terminal displaying the ticker information along with the displayed video based on the video data received from the first terminal such that the displayed ticker information displayed by the second terminal is inserted within the video displayed by the second terminal, the displayed ticker information displayed by the second terminal being based on the ticker information the second terminal receives from the ticker device.

12. The system of claim 11 wherein the address at which ticker information from the ticker device is receivable is a uniform resource identifier that indicates the address of a source of the ticker information.

13. The system of claim 12 wherein a transmission protocol with a respective port through which the ticker information is to be transmitted is within the parameters for transmission of ticker information included within the first message.

14. The system of claim 13 wherein a payload type is identified within the transmission parameters of the first message.

15. The system of claim 14 wherein at least one of formatting information and display information is within the first message to define how to adjust the ticker information for displaying the ticker information for playback of the ticker information.

16. The system of claim 15 wherein the second terminal reconstructing the ticker information displayed by the second terminal for playing back the displayed ticker information.

17. The system of claim 16 wherein the ticker information that is displayed by the second terminal is inserted linearly as crawling information.

18. The system of claim 11 wherein the establishing of the multimedia data connection between the first and second terminals such that ticker information from the ticker device is also sent to the second terminal when the multimedia data connection between the first and second terminals is formed is established such that there is a first connection between the second terminal and the first terminal that is formed based on the transmission parameters for the multimedia data connection and a second connection between the second terminal and the ticker device that is formed based on the parameters for transmission of ticker information, the video data received by the second terminal from the first terminal being received via the first connection, the ticker information transmitted from the ticker device received by the second terminal being transmitted to the second terminal via the second connection.

19. The system of claim 18 wherein the multimedia data connection is a video-telephone communication connection.

20. the system of claim 19 wherein each of the terminal devices is one of a telephone, a personal computer, and a computer device, and the enterprise system is a server.

* * * * *